United States Patent [19]

Grace

[11] Patent Number: 5,071,614
[45] Date of Patent: Dec. 10, 1991

[54] METHOD OF MOLDING A CARPET HAVING DEEP WELL AREAS

[75] Inventor: Ronald R. Grace, Hamilton, Ohio

[73] Assignee: Nifty Products, Inc., Hamilton, Ohio

[21] Appl. No.: 542,969

[22] Filed: Jun. 25, 1990

[51] Int. Cl.⁵ .................... B29C 33/42; B29C 51/08
[52] U.S. Cl. .................................. 264/322; 264/25; 264/243; 264/324
[58] Field of Search .................. 264/322, 324, 25, 243

[56] References Cited

U.S. PATENT DOCUMENTS

| 2,939,179 | 6/1957 | Penman et al. | 264/134 |
| 3,115,678 | 12/1963 | Keen et al. | 264/322 |
| 3,635,629 | 1/1972 | Saladin | 425/173 |
| 3,743,689 | 7/1973 | Saladin | 264/322 |
| 3,979,487 | 9/1976 | Squier et al. | 264/225 |
| 4,701,293 | 10/1987 | Mead | 264/258 |

FOREIGN PATENT DOCUMENTS

| 1580391 | 10/1970 | Fed. Rep. of Germany | 264/322 |
| 87313 | 5/1982 | Japan | 264/322 |

Primary Examiner—James Lowe
Attorney, Agent, or Firm—Charles R. Wilson

[57] ABSTRACT

Molded carpet for use in motor vehicles is made by a method which allows the molding of carpet having deep well areas. The method comprises the steps of heating a plastic backed carpet blank to a degree to make its backing pliable and thereafter molding the heated carpet in a set of specially constructed molds. The molds generally have the shape of the floor area to be covered. However, they are arch-shaped from edge to edge at those portions of the mold where draws are needed to accommodate specially contoured well areas of the motor vehicle's floor area.

10 Claims, 3 Drawing Sheets

METHOD OF MOLDING A CARPET HAVING DEEP WELL AREAS

This invention relates to a method of molding carpet. More particularly, the invention relates to a method of molding a plastic backed carpet blank to a contoured shape having abrupt angled well areas.

Motor vehicles, especially automobiles and vans, typically have a carpet installed on a floor surface area. The carpet is primarily for aesthetic reasons, but additionally is used for comfort and noise reduction reasons. The carpet is often a plastic backed carpet which has been molded to impart a particular shape to the carpet. The floor areas of motor vehicles are very contoured to accommodate wheel wells, drive train humps and other functional and styling needs. Properly molded carpet will fit neatly into a contoured floor area without excess material or wrinkles.

Molded carpets as used in motor vehicles are produced in a method involving the application of heat and pressure. Initially, a flat carpet blank with a thermoplastic backing is cut to a length and width slightly larger than the planar dimensions of the floor area to be covered. The carpet blank is passed through an oven to soften the plastic backing to a state sufficient to make it pliable. The heated carpet blank is then placed between complimentary male and female carpet molds having a desired shape and contour. Necessarily, the carpet molds are uniquely designed to produce molded carpet which fits into a prescribed vehicle make and model. The molds are closed under pressure. The carpet blank between the molds assumes the shape of the molds and, upon cooling, permanently retains that shape. Excess material is trimmed off the edges and ultimately the molded carpet is installed in the motor vehicle.

A particular problem for the molded carpet manufacturer in recent years has been the need to supply molded carpet for use in wide bodied vans having a number of deeply contoured floor areas. It can be appreciated that carpet blanks are originally planar in shape. When the plastic backing is softened and pressure from a set of mating molds is applied, the carpet will stretch in certain directions while it will contract in other directions. There is only a limited amount of stretch obtainable from a small area of carpet blank. Excessive stretching, which can result from deep well areas, can cause the carpet to tear. This, of course, will cause the molded carpet to be rejected. Modern vans pose a problem because of their large floor areas and typical deeply contoured floor areas.

In accord with a need, there has been developed a method to produce a molded carpet using a minimum of carpet material. Additionally, the method is able to handle deep well areas in a mold without tearing of the carpet.

SUMMARY OF THE INVENTION

The method of molding a substantially flat narrow width plastic-backed carpet blank to a substantially flat carpet piece having a contoured shape with deep well area designed to fit the interior floor area of a motor vehicle, comprises the steps of: (a) heating the carpet blank to a temperature sufficient to soften the plastic until pliable; and (b) molding the carpet blank by positioning it between a set of male and female molds and thereafter closing said molds under pressure to impart the general shape of the molds to the carpet blank. Each of the molds is characterized in having a generally arch-shape extending across its width in at least one area where an extensive draw of carpet is required because of the mold's design.

DETAILED DESCRIPTION OF THE INVENTION

Figure 1:
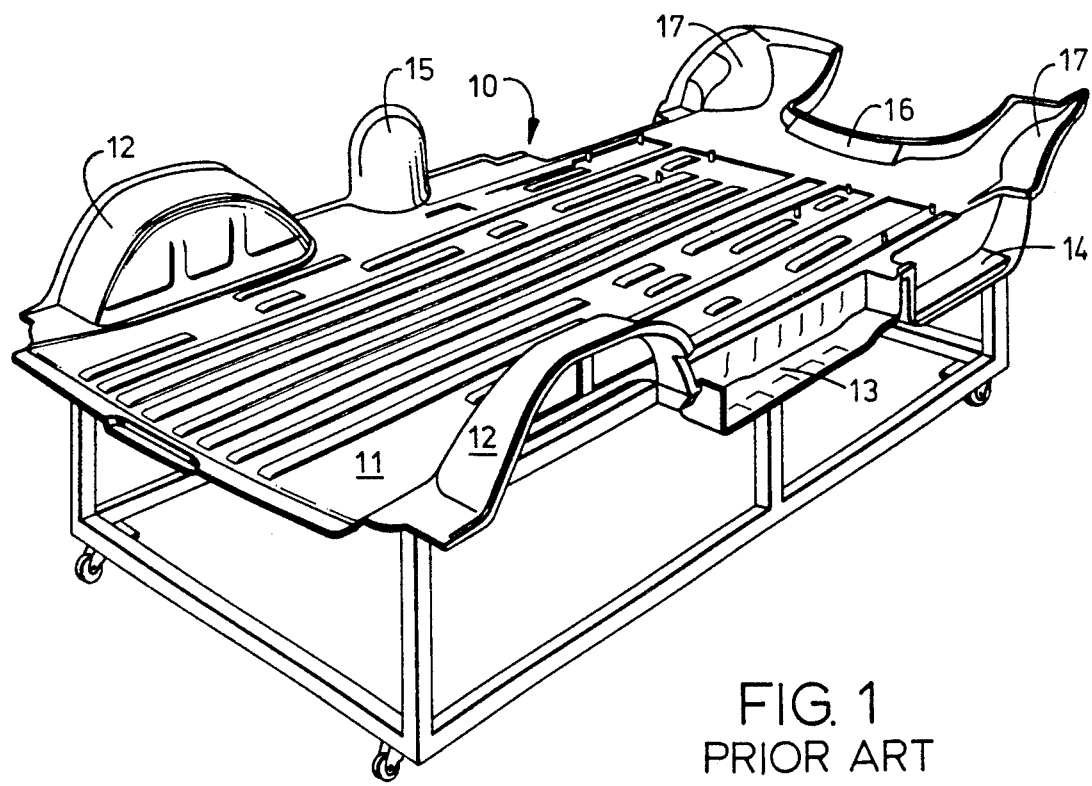
FIG. 1 is a view in perspective of a prior art mold used to produce a molded carpet.
Figure 2:
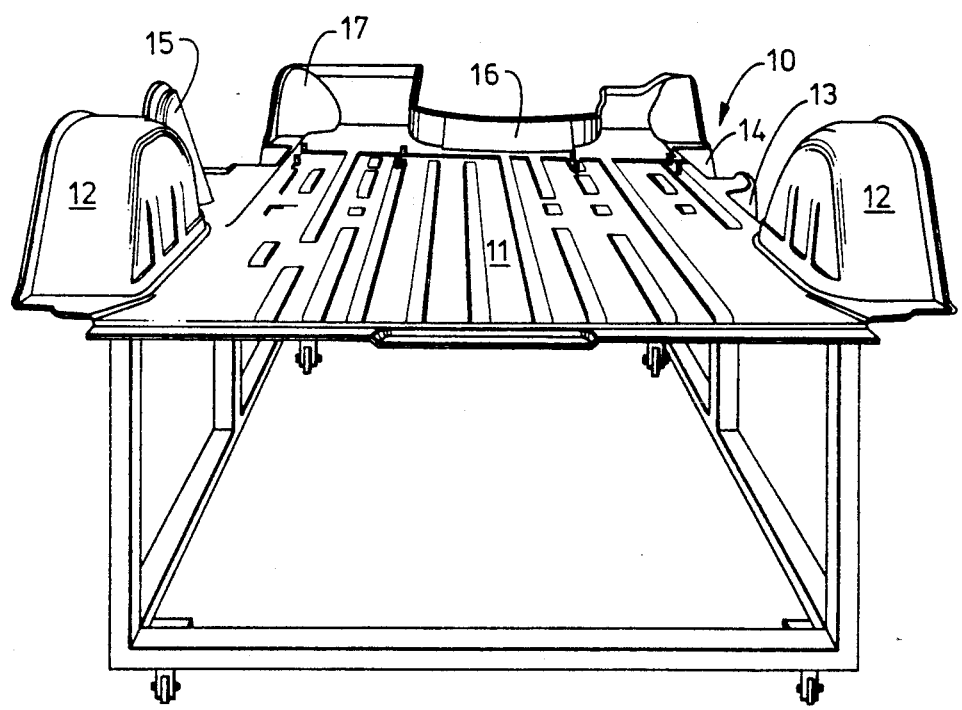
FIG. 2 is an end view of the mold of FIG. 1.
Figure 3:
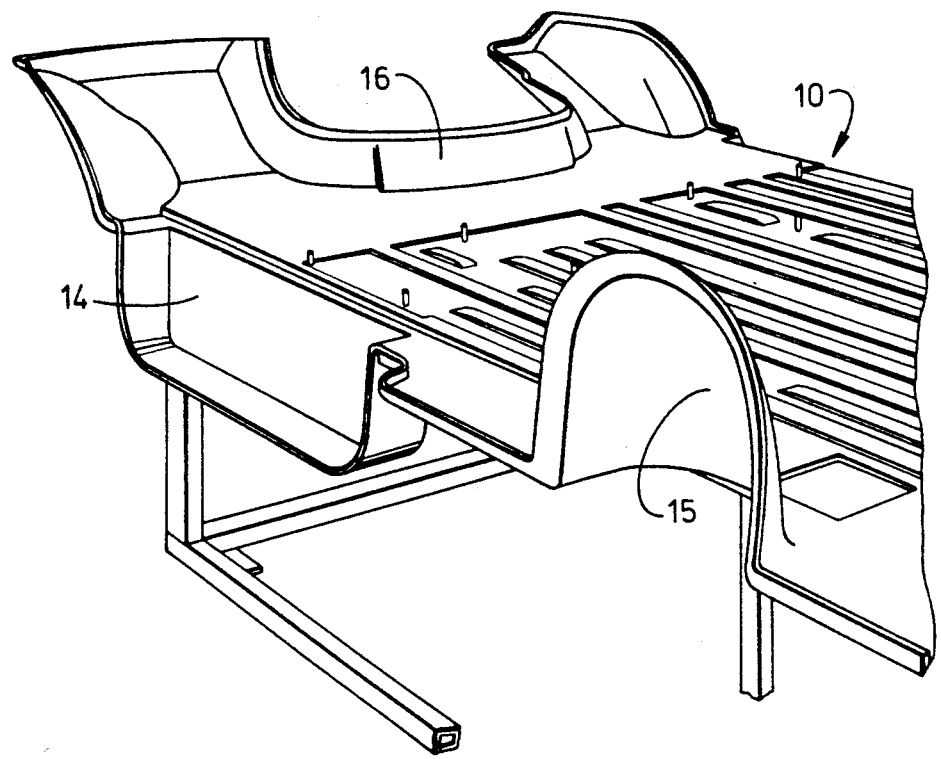
FIG. 3 is another perspective view of a part of the mold of FIG. 1 showing two deep well areas.

The description of the invention which follows is made with particular reference to the drawings. FIGS. 1-3 show a mold used in one step of a prior art method while FIGS. 4-7 show the molds used in the method of this invention. The method of the invention is first generally described and then specifically described with reference to the drawings.

The method of the invention uses a plastic backed carpet material. Such carpet materials are commercially available. The particular weight and color of the carpet are usually specified by the vehicle manufacturer for new vehicles or the vehicle's owner for those vehicles whose original carpet is being replaced. A carpet weight of at least about 8 oz., preferably about 8 oz. to about 30 oz. is generally used. A thermoplastic material which is tough, elastic and non-tacky is used as the backing. Examples of such backings include polymers of ethylenevinyl acetate, ethylene, and acrylic acid. The backings are applied to the carpet in any manner, e.g. from a dispersion or by extrusion. The thermoplastic backing material is preferably capable of being softened at a temperature of from about 300° F. to about 500° F. to a sufficient degree to be readily molded.

The carpet to be molded is cut to a size which is sufficient to result in a complete molded carpet piece, yet with as little excess as possible. Obviously, excess carpet material which must later be trimmed off the molded carpet and discarded is a waste. As discussed in the following paragraphs, the method of this invention is able to use less carpet material without affecting the quality of the molded carpet product. Interior floor surface areas of most motor vehicles are rectangular in shape; accordingly, the carpet blanks are also cut to this same general shape. The carpet's dimensions approximate the outside dimensions of a mold used in a later stage of the method. Generally, the resultant carpet blank is from about five feet to about seven feet in width and about eight feet to about fifteen feet in length to result in an area of from about 40 square feet to about 100 square feet.

The carpet blank is initially moved into a heating zone. Several transport means can be used. In one preferred method, a portable open rack is used for this purpose. The carpet blank is clamped into the open rack by yieldable holding means. The rack has a set of wheels to allow it to be moved into the heating zone and subsequent zones of the method. Other modes of transporting the carpet blank throughout the steps of the method can be used, including hand carrying, but the portable rack has proved most efficient.

Any conventional heat source is used in the heating zone. Nicrone coated wire heaters are preferred because of the intense heat they are able to quickly generate. Quartz heaters and forced air can as well be used to accomplish the stated purpose. An adequate number of heaters are employed so as to overlap the carpet edges to substantially evenly heat the carpet. The carpet blank remains in the heating zone sufficiently long to soften the plastic backing on the carpet blank to a pliable or moldable state. The amount of heat and dwell time in the oven will depend on the particular plastic backing and its thickness. Generally, the carpet blank is left in the heat zone until a carpet surface temperature of from about 300° F. to about 500° F. is reached. The heated carpet blank is promptly transported into a molding zone. Complimentary male and female molds are forced together under controlled pressure. Shaped wells in the molds tend to draw outer portions of the carpet into them. Yieldable holding means are normally used on the carpet edges to exert tension where needed so as to keep the carpet substantially free of wrinkles and uniform throughout this step.

The molded carpet is finally cooled to set the thermoplastic backing and trimmed. Typically, these steps occur while the carpet is still positioned between the molds, though once the carpet has cooled sufficiently to set the plastic backing, it can be removed for full cooling and trimming in separate zones. The resultant molded carpet retains the contour imparted by the mold due to the nature of the plastic material. The molded carpet is ultimately shipped and installed in a motor vehicle simply by properly positioning it and securing the edges. The preformed carpet follows the contour of the vehicle's floor surface area. FIGS. 1-3 show a mold 10 used by the prior art in the molding of plastic backed carpet. Only the male mold is shown for illustration purposes. The mold is in effect a replica of a floor area of a particular motor vehicle. The main floor area 11 of the mold is generally flat, both length-wise and width-wise. The rear wheel wells 12 each have an inside wall which is substantially perpendicular to the floor area 11. The side and top walls of the wheel wells are contoured to follow the outline of a wheel. Rear step wells 13 and front step wells 14 at mid length on the mold also have side walls which are substantially perpendicular to the floor area with a parallel foot portion. A post well 15 is also provided in the mold to accommodate interior styling of the particular vehicle. A shaped front foot area 16 of the mold is gently sloped upwardly and is for the purpose of creating a foot rest area for driver and front seat passengers. The front wheel wells 17 extend off of the forward area 16 and are gently contoured partially for comfort reasons.

It will be noted the wheel wells, step wells, and post well areas of the prior art mold are al very deeply contoured. These areas cause deep draws in the carpet blank during the molding stage and are areas where the carpet is likely to tear. In effect, carpet in the immediate vicinity of the deep well areas is stretched into the well areas by the action of the molds closing together. Excess carpet width allows a certain draw from the carpet blank edges, but, of course, results in excessive raw material usage and is not fully effective. A greater concern is that the deep well areas will tend to draw carpet from an adjacent interior portion of the blank to the extend a carpet tear will result. Other more interior areas because of the distance involved will not be subjected to the same tension.

In accord with this invention, an arch-shaped set of molds is used in the molding stage which results in carpet blank raw material savings and less quality control problems. The unique molds allow a fuller use of the total carpet blank to accommodate the carpet material demands occasioned by the deeply contoured well areas of the molds. The operating steps of heating and molding as above discussed are used in the method of this invention.

Figure 4:
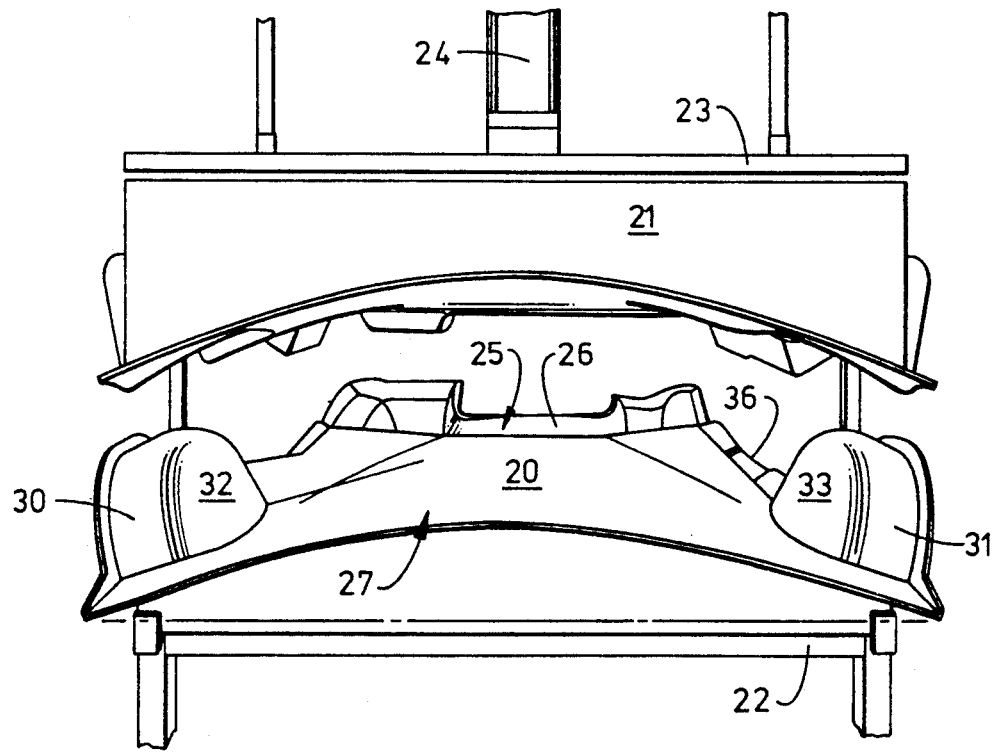
FIG. 4 is an end view of a set of arch-shape molds used in the method of this invention.
Figure 5:
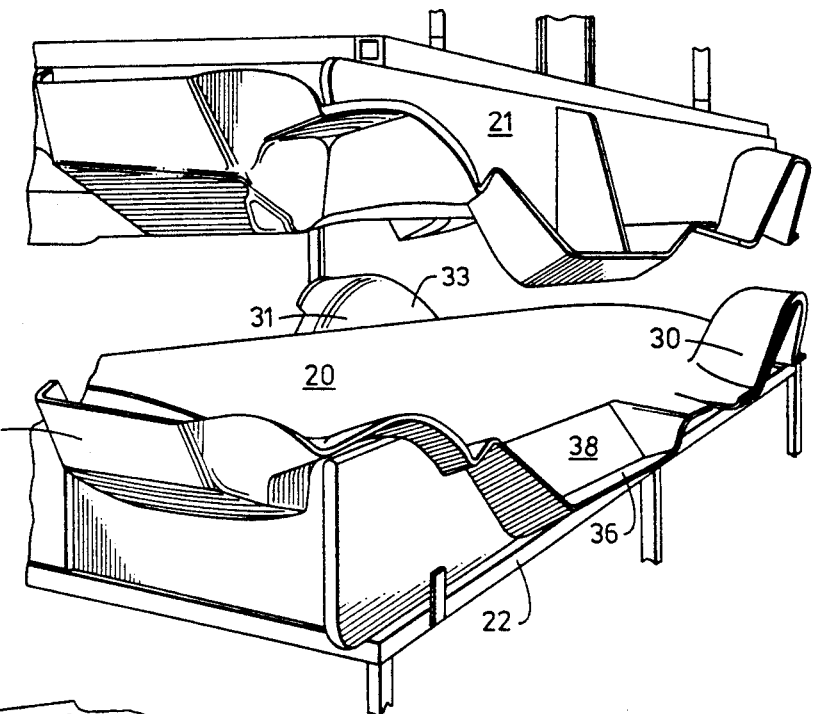
FIG. 5 is a view in perspective of the arch-shape molds of FIG. 4.
Figure 6:
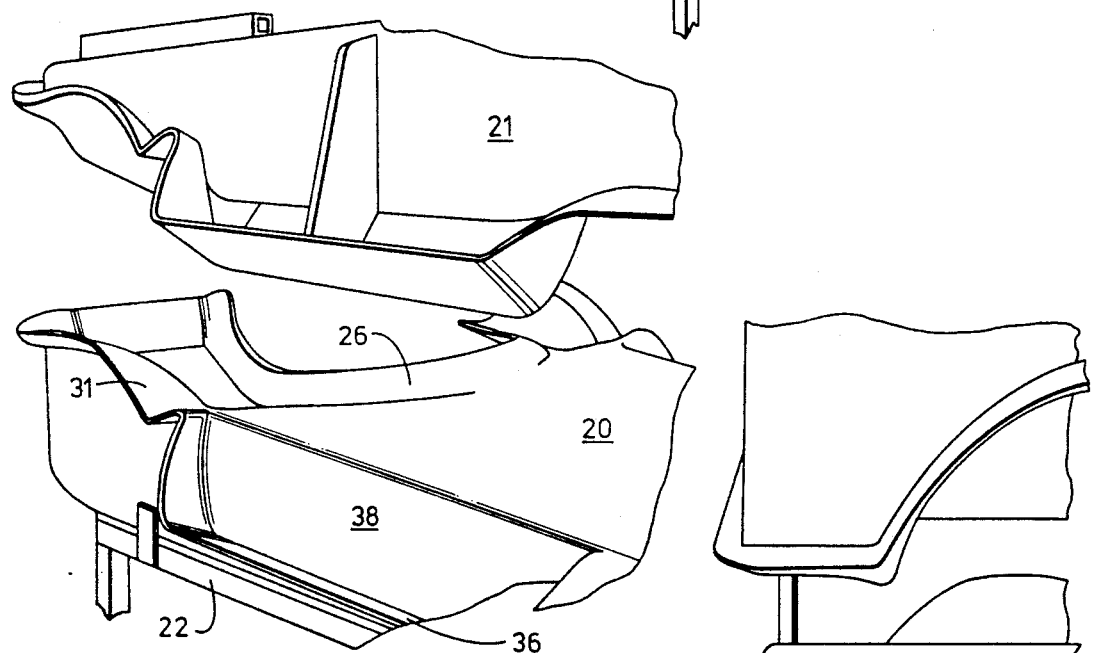
FIG. 6 is another perspective view of a part of the molds of FIG. 4 showing a deep well area of a step well.
Figure 7:
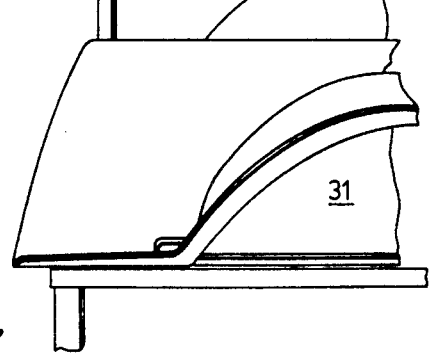
FIG. 7 is a partial side view of the molds of FIG. 4.

With reference to FIGS. 4 and 5, there is shown a set of complimentary molds used in the method of this invention. A male mold 20 and a female mold 21 generally have the shape of a floor area of a motor vehicle. The molds are generally dimensioned and contoured according to the particular motor vehicle's floor surface area to be covered with the molded carpet. The molds are fabricated from fiberglass reinforced resinous material. The molds can as well be made from cast metal, e.g. aluminum, especially where water cooling in the molds is desired for faster cooling of the molded carpet. The male mold 20 is set on a platform 22 and is stationary. The female mold 21 is suspended by a movable rack 23 operably connected to a power source, such as a hydraulic cylinder 24.

The description which follows is with respect to the male mold 20. It should be understood the same criteria and parameters exist for the female mold 21. A forward area 25 is substantially flat from side to side of the mold and from about mid length of the mold to a sloping front foot area 26. The rear area 27 of the mold, however, is arch-shaped from side to side. The degree of arching is critical. Too little arching will approximate the prior art flat molds and give no noticeable improvement in the method while too much arching will result in a molded carpet which will retain the arch shape and not flatten to properly lie in the motor vehicle's floor area. A degree of arching which results in a vertical distance from the apex of the arch to an adjacent side edge of about one-half inch to about one and one-half inches per foot of mold width has been found to be optimum. Preferably, a degree of arching which results in a vertical distance from apex to side edge of about one inch per foot of mold width is used. The rear wheel wells 30 and 31 are tilted outwardly to the horizontal, though the side walls 32 and 33 of the respective wells are substantially perpendicular to the immediate arched portion of the mold from which they extend. It has been found deep draw areas as presented by the wheel wells must be so configured to result in a molded carpet which lays properly. The step well 35 as most evident in FIGS. 5 and 6 also is tilted outwardly and has a side wall 37 which is substantially perpendicular from the immediate arched portion of the mold from which it extends. It should be understood all edge wells found on the mold are similarly configured in accord with this invention. That is, the side walls of the edge wells configured into the particular mold which are located in the arch-shaped portion of the mold are all substantially perpendicular to the portion of the mold from which the respective side wall extends.

The molds used in the method of this invention must meet two important criteria. First, a portion of each mold is arch-shaped across the width of the mold. The arch-shape of the mold is located in at least that area of the mold where the deepest carpet draws will be experienced in the molding method. This will typically be from the rear of the mold to about a mid-length point in the mold. The arch shape can as well extend the entire length of the mold. Second, edge wells which are located in the arch-shaped portion of the mold are configured so that their side walls are substantially perpendicular to that portion of the mold from which each extends. Preferably, though not necessary, the side walls of the edge wells located in that part of the mold which is flat also are titled outwardly.

In operation, a substantially flat carpet blank is heated to soften its plastic backing and is then positioned between the arch-shaped male and female molds. As the molds are closed together under pressure, the carpet blank begins to assume the shape of the molds. Those portions of the mold which contact first tend to fix that portion of the carpet blank in an immovable state. However, the arch shape nature of the molds permits carpet to be drawn more evenly from substantial portions of the carpet blank to accommodate the deep well areas which must draw carpet into them to form the continuous molded carpet. In effect a better distribution of forces is obtained. The result being a more uniform stretching of the carpet blank and less localized carpet stretchinq and resultant tears. When the carpet is cooled to set its thermoplastic backing and removed from the molds, it will assume a substantially flat shape. That is, the arch-shape of the mold is not evident in the molded product. The molded carpet is readily installed in a vehicle for which it was intended.

While the invention has been described with particular reference to the drawings and preferred embodiments, it should be understood various modifications can be made. For example, a felt underlay or vinyl heel pad can be positioned in the molds prior to molding the carpet blank. Such features in a molded carpet are conventional. These and other obvious changes and modifications are intended to be within the scope of the appended claims.

What is claimed is:

1. The method of molding a substantially flat narrow width plastic-backed carpet blank to form a substantially flat carpet piece having a contoured shape with deep wells, said carpet piece designed to neatly fit the interior floor area of a motor vehicle without substantial wrinkles, comprising the steps of:
   (a) heating the substantially flat narrow width plastic-backed carpet blank to a temperature sufficient to soften the plastic until pliable; and
   (b) molding the carpet blank by positioning it between a set of male and female molds and thereafter closing said molds under pressure to impart the general shape of the molds to the carpet blank, wherein each of said molds is characterized in having a deep well near each side edge to accommodate a wheel well in the floor area of the motor vehicle and further being generally arch-shaped across its width from a deep well on one side edge to a deep well on an opposite side edge.

2. The method of claim 1 wherein each of the deep wells has a vertical wall approximately perpendicular to the arch portion of the mold from which it extends.

3. The method of claim 2 wherein the arch shape has a degree of arching which results in a vertical distance from an apex of the arch to an adjacent side edge of about one-half inch to about one and one-half inches per foot of mold width.

4. The method of claim 3 wherein each of the molds has the arch shape extending from a rear edge to about its mid-point and has a substantially flat shape for the balance of its length.

5. The method of claim 4 wherein the degree of arching is about one inch per foot of mold width.

6. The method of claim 1 wherein the molded carpet piece has planar dimensions of about five feet to about seven feet in width and about eight feet to about fifteen feet in length.

7. The method of molding a substantially flat narrow width plastic-backed carpet blank to a substantially flat carpet piece having a contoured shape with deep wells, said carpet piece designed to neatly fit the interior floor area of a motor vehicle without substantial wrinkles, comprising the steps of:
   (a) heating the substantially flat narrow width plastic-backed carpet blank to a temperature sufficient to soften the plastic until pliable; and
   (b) molding the carpet blank by positioning it between a set of male and female molds and thereafter closing said molds under pressure to impart the general shape of the molds to the carpet blank, wherein each of said molds is characterized in being generally arch-shaped across its width in at last one area where a deep draw of carpet is required because of the mold's design, wherein the arch shape has a degree of arching which results in a vertical distance from an apex of the arch to an adjacent side edge of about one-half inch to about one and one-half inches per foot of mold width.

8. The method of claim 7 wherein each of the molds has the arch shape extending from a rear edge to about its mid-point and has a substantially flat shape for the balance of its length.

9. The method of claim 8 wherein the degree of arching is about one inch per foot of mold width.

10. The method of claim 7 wherein the molded carpet piece has planar dimensions of about five feet to about seven feet in width and about eight feet to about fifteen feet in length.

* * * * *